Aug. 24, 1943.  B. C. RANNEY  2,327,930
SOD CUTTER
Filed Jan. 13, 1941  3 Sheets-Sheet 1
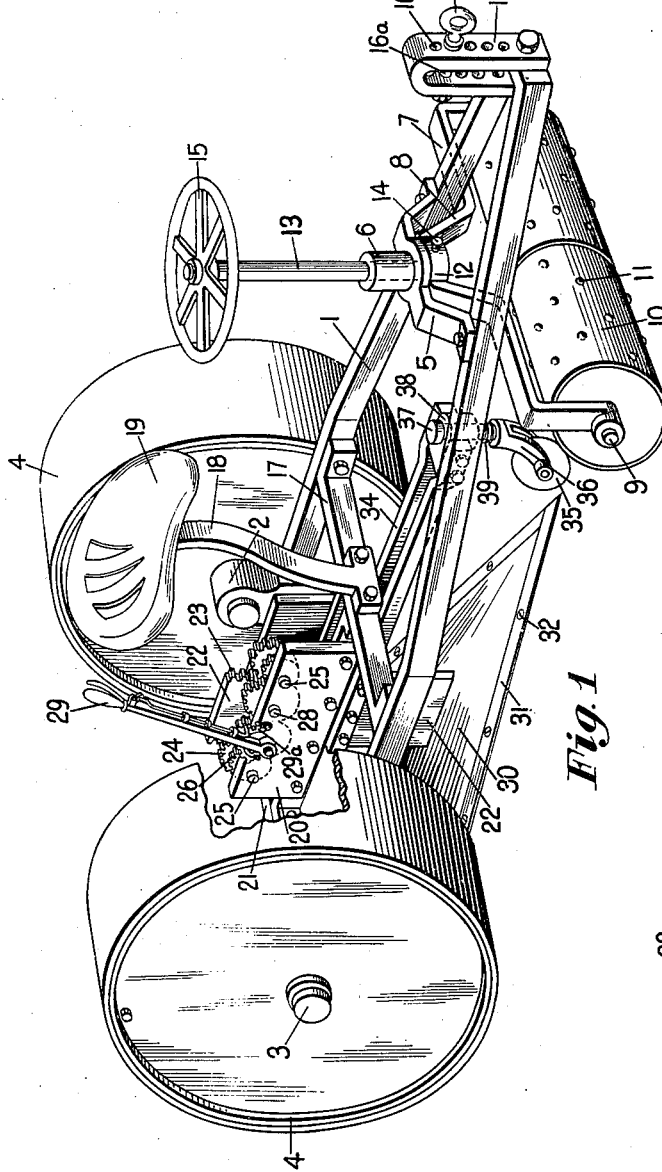
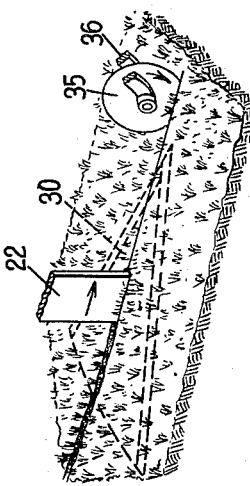
INVENTOR.
Boivin Clark Ranney.
BY
Corbett, Mahoney + Miller
ATTORNEYS.

Aug. 24, 1943. B. C. RANNEY 2,327,930
SOD CUTTER
Filed Jan. 13, 1941 3 Sheets-Sheet 2
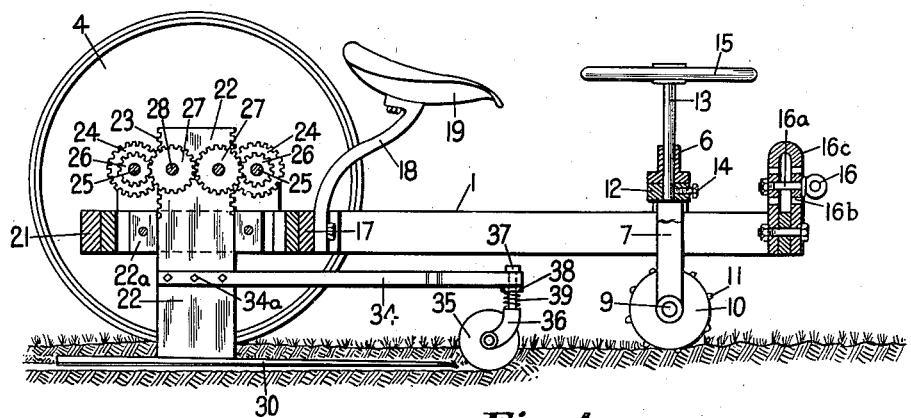
Fig. 4
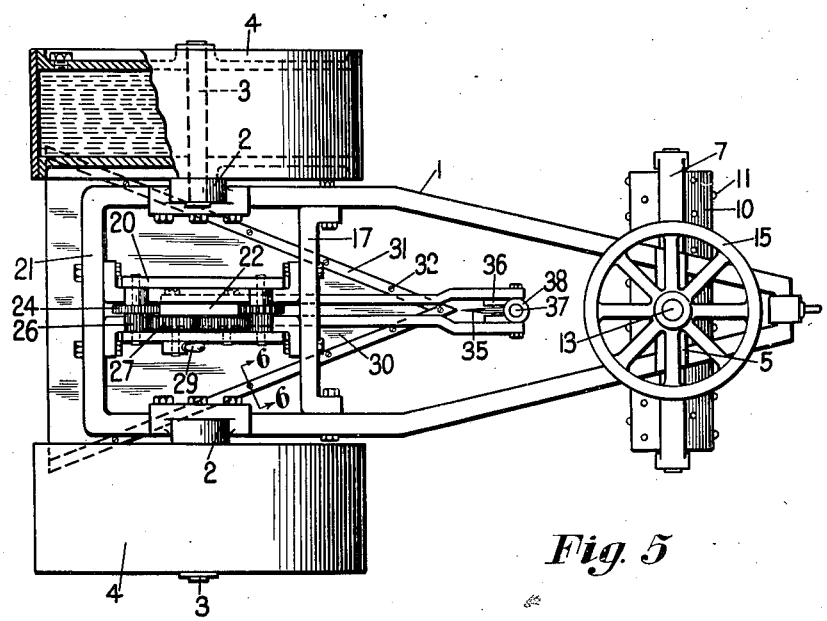
Fig. 5
Fig. 6
INVENTOR.
Boivin Clark Ranney.
ATTORNEYS.

Aug. 24, 1943.  B. C. RANNEY  2,327,930
SOD CUTTER
Filed Jan. 13, 1941  3 Sheets-Sheet 3

INVENTOR.
Boivin Clark Ranney.

BY
ATTORNEYS.

Patented Aug. 24, 1943

2,327,930

UNITED STATES PATENT OFFICE 2,327,930

SOD CUTTER

Boivin Clark Ranney, Gahanna, Ohio

Application January 13, 1941, Serial No. 374,164

4 Claims. (Cl. 97—226)

My invention relates to a sod cutter. It has to do, more particularly, with the cutting of sod in rows, although it is not necessarily limited thereto.

In the prior art, various types of sod cutters have been suggested but they are either too complicated, cumbersome or inadequate to produce an efficient job of sod cutting and required a certain amount of skill on the part of the operator. The prior art sod cutters with which I am familiar do not make a clean cut of sod but are of such a nature that some manual means, such as a cutting tool or shovel, is required to completely sever the sod from the ground. Furthermore, these prior art sod cutters are usually of such a nature that slight undulations in the terrain over which the machine works interfere with the proper cutting of the sod. They are of such a nature that the cutting member is not held at a uniform depth. Also, they are usually of such a nature that when one strip is cut, it must be rolled up and removed before the next strip adjacent thereto can be cut. Also, some prior art sod cutters will not work under all weather conditions. Prior art sod cutters have been possessed of other disadvantages.

One of the objects of my invention is to provide a simple apparatus whereby rows of sod may be cut both along the edges and beneath with a relatively simple mechanism.

Another object of my invention is to provide an apparatus which will actually cut the edges and sever the sod underneath from the ground in one operation so that it is not necessary to later use any form of shovel or cutting tool but to merely roll up the sod into suitable form for transportation.

Another object of my invention is to provide apparatus whereby the actual sod-cutting mechanism is capable of vertical adjustment to accommodate the different conditions encountered.

Another object of my invention is to provide a machine of the type indicated which is of such a nature that the cutting member will be held at a uniform depth thereby resulting in sod being cut which is of uniform thickness.

Another object of my invention is to provide a machine of the type indicated wherein the cutting member may be readily adjusted to the desired operative position or to a completely inoperative position.

Another object of my invention is to provide apparatus whereby an undercutting plow is utilized which will avoid many of the difficulties characteristic of methods and apparatus hitherto utilized.

Another object of my invention is to provide a sod-cutting machine of such a nature that slight undulations in the surface over which it works will have substantially no effect on the sod-cutting operation.

Various other objects and advantages will appear as this description progresses.

With the preferred form of apparatus which I utilize, a row of sod is cut by cutting the edge thereof and simultaneously undercutting one half of the row, then turning the machine and cutting the other edge of the row and simultaneously undercutting the other half of the row. The apparatus preferably comprises a cutting blade or plow which serves to effect the undercutting operation and a vertically disposed disk which serves to cut one edge of the row. Preferably, the sod-cutting blade or plow is of a substantially triangular nature with its point foremost and is combined with the cutting disk, which is located in advance of the cutting blade or plow and substantially in line with the point thereof. Likewise, the apparatus is preferably provided with a means for raising and lowering the cutting blade and disk to insure the proper depth of cutting. In addition, I find it desirable to provide rollers for operating upon the top of the row of sod, with such rollers being provided with cavities designed to receive water or other weighting substances, to insure that the mechanism will be firmly held downwardly upon the row and to insure that the upper surface of the row of sod, which is finally removed, will be smooth and even.

The preferred embodiment of my apparatus is shown in the accompanying drawings wherein similar characters of reference designate corresponding parts and wherein:

Figure 1 is a perspective view of my preferred type of apparatus.

Figure 2 is a diagrammatic view of the cutting disk and plow in operation cutting sod.

Figure 3 is a similar view of the plow in operation showing the rear edge thereof.

Figure 4 is a side elevation, partly broken away, of my apparatus.

Figure 5 is a top plan view of my sod-cutting apparatus.

Figure 6 is a sectional view taken through the plow or cutting blade along line 6—6 of Figure 5.

Figure 7:
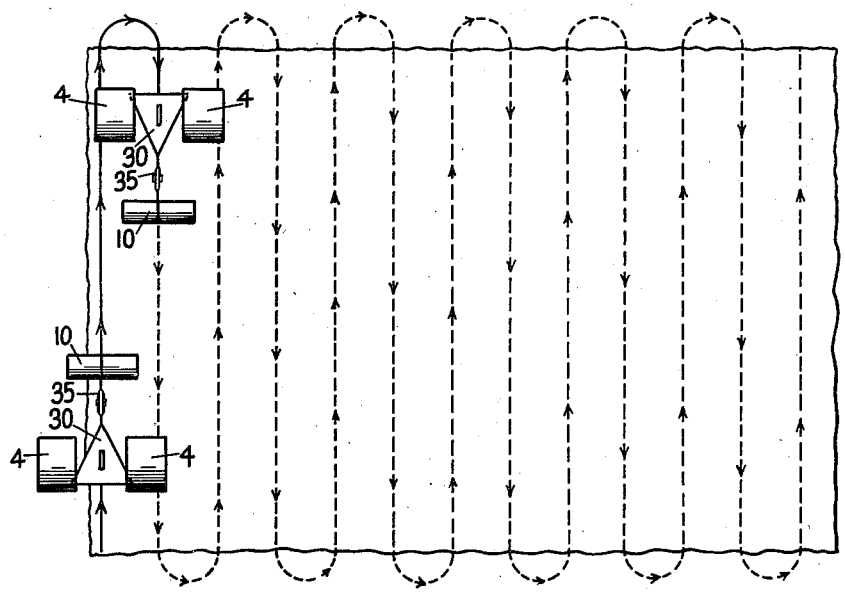
Figure 7 is a diagrammatic view showing how the sod-cutting device will cut one row after another.

With reference to the drawings, I have illustrated my sod-cutting machine as comprising a main frame 1 which is substantially square at its rear portion and which is of substantially triangular shape at its forward portion. The rear end of this frame carries a pair of brackets 2 which support trunnions 3. The trunnions 3 carry large rollers 4. The front end of the frame carries a transversely disposed inverted U-shaped bracket 5. This bracket 5 carries an upstanding bearing sleeve 6. A roller-supporting yoke member 7 is provided which has an inverted U-shaped portion 8 intermediate its ends which extends upwardly within the similarly shaped bracket 5. The yoke 7 carries, at the lower end of its arms, an axle 9 which supports a pair of rollers 10.

The rollers 10 are provided with a plurality of small projections 11 on the surface thereof. These projections are in staggered relationship and will prevent slipping of the rollers although they will only bite into the sod slightly. The rollers 10 are independently rotatable on the axle 9 and the joint therebetween is substantially midway of the outer extremities of the yoke 7. The upper end of the portion 8 carries a sleeve member 12. A shaft 13 extends down through the bearing 6 and into the sleeve 12, as shown best in Figure 4. The lower end of the shaft 13 is keyed to member 12 by means of a setscrew 14. The shaft 13 may be rotated by means of a handwheel 15 keyed on the upper end thereof. It will be apparent that when the handwheel 15 is rotated, the shaft 13 will rotate in the bearing 6 and this will swing the yoke member 7 and the double roller structure about the axis of the shaft 13. Thus, this provides means for guiding the machine.

The machine is made very compact and has a small wheelbase so that undulations in the terrain over which it works will have a minimum effect on the sod-cutting operation.

The rollers 4 are hollow and are provided with suitable plug-closed inlets by means of which they may be filled with water or other substances to give them considerable weight. It is important to have the rollers of considerable weight so that they will hold the machine down during the cutting of the sod. When it is desired to move the machine to a different location, the water or other substance can be emptied from the rollers. If desired, rollers 10 may also be filled with water although they will usually be of sufficient weight. The front end of the frame 1 is provided with an eye member 16 by means of which the machine may be attached to a tractor, truck or other suitable power unit for pulling it along. It is preferably pulled by a long chain pull so that it can be guided relatively independently of the tractor. The eye member 16 is carried by a bolt 16a which may be positioned in any of the vertically spaced openings 16b formed in bracket 16c so that the line of pull will always be horizontal and, therefore, will not tend to pull the sod-cutting member out of the sod.

The frame 1 is further provided with a transverse supporting member 17 to which the lower end of a seat support 18 is bolted. The seat 19 carried on the upper end of this support is so disposed that an operator sitting on it can readily operate the wheel 15.

The sod-cutting mechanism of my machine will now be described in detail. It will be apparent from Figure 1 of the drawings that I provide a pair of laterally spaced longitudinally extending plates 20 which are suitably attached at their front ends to member 17 and at their rear ends to the rear cross member 21 of the frame. Mounted between these plates for vertical movement within guide members 22a is a vertically disposed rack member 22. This rack member has a rack section 23 on each side edge thereof. Each of the sections 23 is engaged by a gear 24. The gears 24 are keyed on shafts 25 which are rotatably carried by the plates 20. Each of the shafts 25 also carry a pinion 26 which is keyed thereto. Each of the pinions 26 is engaged by one of a pair of gears 27 which are keyed on shafts 28 rotatably mounted in one of the plates 20. The two gears 27 intermesh with each other. One of the shafts 28 is provided with an extension to which the lower end of a hand lever 29 is keyed. It will be apparent that when the lever 29 is swung, the gears 24 will be rotated in such a manner that the plate 22 will be raised or lowered. A ratchet mechanism 29a is provided for holding the lever 29 in any position to which it is adjusted.

The plate 22 carries on its lower end the sod-undercutting plate or plow 30. The plate 30 is horizontally disposed and the plate 22 is perpendicular thereto. The plate 30 is V-shaped or triangular in outline with its apex directed forwardly. As illustrated in Figure 6, the cutting edges 31 of the plate 30 may be separate from the body portion of the plate so that they may be of hardened steel. The edges 31 are bolted, as at 32, to the body portion of the plate and may be easily removed and replaced. The plate 30 is upwardly bowed transversely and is inclined upwardly slightly towards the rear, as indicated best at 33 in Figure 3. I have found in actual practice that the transverse bowing of this plate facilitates greatly the cutting of the sod. It serves to produce a wedging action which lifts the sod. Furthermore, it produces a suction beneath the plate which tends to hold the plate down in position. Also, it provides a self-cleaning feature, since it permits small stones and dirt to pass back beneath the plate. The point of the plate is turned down slightly, as shown in Figure 4, so that the plate will tend to enter the ground instead of tending to emerge from the ground.

The plate 22 also carries a forwardly projecting arm 34 which has its rear end bolted thereto as at 34a. The forward end of this arm 34 supports an edge-cutting disk 35. This disk 35 is rotatably carried by a rearwardly extending yoke 36. The yoke 36 is carried by a pin 37 which is swiveled in a sleeve 38 on the forward end of arm 34 in such a manner that limited vertical movement is permitted. A spring 39 on the pin 37 below the sleeve 38 normally forces the cutting disk 35 downwardly but permits upward movement in case the disk strikes a stone or other hard object. The disk 35 is supported in alignment with the point of the plate 30. The lower edge of the disk 35 is normally held at a level which is lower than the lower surface of plate 30 so that the disk will completely sever the edge of the strip of sod, as will later appear.

It will be noted from Figure 5 that the rear end of plate 30 is somewhat wider than the distance between the inner edges of rear rollers 4, back between which the plate extends. Thus, part of the sod being cut is disposed between plate 30 and portions of rollers 4 and this serves to hold the machine down in position during the cutting operation.

In the use of this machine, the lever 29 is first operated to adjust the plate 30 to the proper vertical position on the frame so as to undercut the sod at the proper depth. It will be noted that vertical adjustment of the plate 30 will simultaneously adjust the edge-cutting disk 35. When the proper adjustment has been made, the machine is pulled along by a tractor or other suitable power unit.

At the start of the cutting operation, the weight of the machine will be resting on plate 30 and the rollers 4 will be spaced from the surface. However, as the machine is pulled along, the point of plate 30 will enter the sod and the plate will assume a position at the proper depth during continued movement of the machine. The blade 30 will undercut the sod while the cutting disk 35 will slit the sod along a line in alignment with the point of plate 30 and with plate 22, as shown best in Figure 2, and will completely sever it. The plate 30 will operate beneath the sod at the proper depth and a wedging action will be exerted on the sod which will tend to lift it and which is produced by the bowing of the plate as shown in Figure 3. The blade 30 will be self-cleaning, as previously stated. Also, because the rear end of the plate 30 overlaps rollers 4, the plate will be more effectively held at the proper level. Also, because the machine has a short wheelbase, since everything is compact, irregularities in the surface will have substantially no effect on the position of plate 30.

In the use of my machine, I prefer to follow the method which will now be described with particular reference to Figure 7. To cut the first row, the machine is pulled along with the blade 30 undercutting only one half of the row. Simultaneously, the cutting disk 35 will produce a straight outer edge on the first row of sod cut. The inner roller 10 will smooth the sod before it is cut. When the machine reaches the end of the row, the plate 30 and disk 35 may be lifted and the machine may then be turned without tearing or cutting up the sod during turning. When the machine is turned, it is so positioned that the outer roller 4 will operate on the portion of the strip of sod already cut. The rollers 10 and the inner roller 4 will operate on the sod yet to be cut. When the machine is turned, as shown in Figure 7, the sod will be undercut for a width corresponding to that of the plate 30. The outer half of the plate 30 will undercut the other half of the first row of sod while the cutting disk 35 will simultaneously sever and form the inner edge of the first row of sod. Thus, it will be apparent that with this machine, a row of sod is cut by cutting the outer edge thereof and simultaneously undercutting one half of the row in a pass of the machine in one direction, then cutting the other edge of the row and simultaneously undercutting the other half of the row in a pass of the machine in the other direction. The rollers will serve to smooth the sod both before and after the cutting operation. It will be noted that the rollers 10 overlap the rollers 4.

Figure 8:
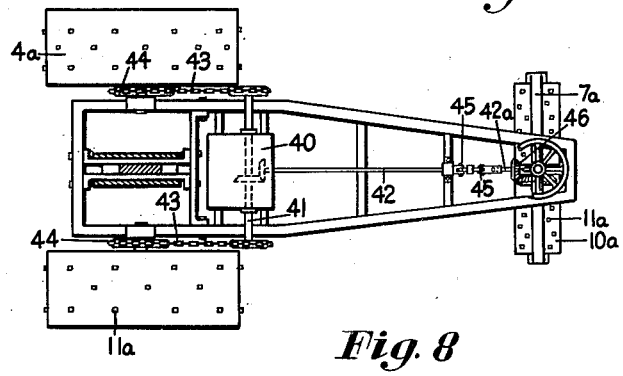
Figure 8 is a top plan view of a modification of my device.
Figure 9:
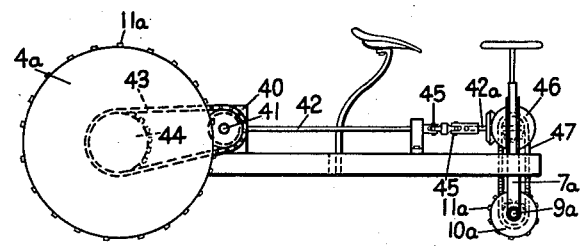
Figure 9 is a side elevation of the structure shown in Figure 8.

In Figures 8 and 9 I have illustrated a modification of my invention. The machine illustrated in these drawings is exactly the same as that previously described with the exception that it is self-propelled. For this purpose it is provided with a power unit 40. This unit 40 drives a transverse shaft 41 and a longitudinal shaft 42. The shaft 41 drives a pair of sprocket chains 43 which drive sprockets 44 that are keyed on the axles of rollers 4a. The shaft 42 extends forwardly and is connected by a pair of universal joints 45 and an extensible shaft portion 42a to a set of bevel gears 46 carried by the roller-supporting yoke 7a. These gears 46 drive a sprocket chain drive 47 which drives the axle 9a on which are keyed the rollers 10a. The rollers 4a and 10a are provided with projections 11a to provide increased traction. Thus, I provide a unit which is of such a nature that it will be self-propelled and can be readily guided.

With my machine the sod is cut in such a manner that it is of uniform thickness. It is not necessary to roll up one row of sod before another can be cut. Furthermore, it is not necessary to use hand tools to completely sever the sod. Also, my sod-cutter will work under all weather conditions whether the sod is extremely dry or extremely wet.

It will be apparent from the above description that I have provided a machine having a number of advantages. Most of these advantages have been discussed and others will be apparent from the drawings and the following claims.

Having thus described my invention, what I claim is:

1. Apparatus for cutting sod comprising a frame, means for supporting the frame for movement along the surface of the sod, said means comprising a pair of rollers disposed on opposite sides of the frame at the rear end thereof, a pair of rollers disposed in side-by-side relationship at the forward end of the frame, said rear rollers overlapping the paths of the forward rollers, a yoke rotatably supporting said forward rollers and pivotally connected to the forward end of the frame, steering means for swinging said yoke about its pivot, said forward rollers being provided with roughened surfaces and being independently rotatable to facilitate steering, said rear rollers being hollow so that they may be filled with water or other heavy substance, a sod cutting mechanism supported by said frame, said sod cutting mechanism comprising a sod undercutting plate of triangular form with its apex directed forwardly, said plate being substantially horizontally disposed and being bowed upwardly and transversely and being inclined upwardly towards the rear end thereof, a vertically disposed plate in alignment with the apex of said sod undercutting plate and having its lower end connected to said sod undercutting plate, said vertical plate being mounted for vertical movement in guides carried by said frame, means for moving said plate vertically and holding it in adjusted position, said means comprising gear and rack mechanism, said sod undercutting plate being disposed below the level of said rear rollers and having its rear portion extending laterally beneath said rollers, a forwardly projecting arm carried by said vertically disposed plate, said arm carrying at its forward end a vertically disposed rotatable edge cutting disc, said disc being carried by a rearwardly extending yoke which is rotatably mounted and is normally held downwardly by resilient means, said disc being disposed in front of said sod undercutting plate in alignment with the apex thereof and the joint between said forward rollers, said disc normally being disposed at a lower level than that of said undercutting plate.

2. Apparatus for cutting sod comprising a frame, means for supporting the frame for movement along the surface of the sod, said means comprising a pair of rollers disposed on opposite sides of the frame at the rear end thereof, a pair of rollers disposed in side-by-side relationship at the forward end of the frame, said rear rollers overlapping the path of the forward rollers, a yoke rotatably supporting said forward rollers and pivotally connected to the forward ends of the frame, steering means for swinging said yoke about its pivot, said forward rollers being independently rotatable to facilitate steering, said rear rollers being hollow so that they may be filled with water or other heavy substance, a sod cutting mechanism supported by said frame, said sod cutting mechanism comprising a sod undercutting plate of triangular form with its apex directed forwardly, said plate being substantially horizontally disposed and being bowed upwardly and transversely and being inclined upwardly towards the rear, a vertically disposed plate in alignment with the apex of said sod undercutting plate and having its lower end connected to said sod undercutting plate, said vertical plate being mounted for vertical movement in guides carried by said frame, means for moving said plate vertically and holding it in adjusted position, said sod undercutting plate being disposed below the level of said rear rollers and having its rear portion extending laterally beneath said rollers, a forwardly projecting arm carried by said vertically disposed plate, said arm carrying at its forward end a vertically disposed rotatable edge cutting disc which is normally held by resilient means with its cutting edge below the level of said sod undercutting plate, said disc being disposed in front of said sod undercutting plate in alignment with the apex thereof and the joint between said forward rollers.

3. Apparatus for cutting sod comprising a frame, means for supporting the frame for movement along the surface of the sod, said means comprising front and rear rollers having overlapping paths and arranged to roll a predetermined width of sod, some of said rollers being hollow so that they may be filled with water or other heavy substance, a sod cutting mechanism supported by said frame, said sod cutting mechanism comprising a sod undercutting plate of triangular form with its apex directed forwardly, said plate being substantially horizontally disposed and being bowed upwardly and transversely and being inclined upwardly towards the rear end thereof, a vertically disposed plate in alignment with the apex of said sod undercutting plate and having its lower edge connected to said sod undercutting plate, said vertical plate being mounted for vertical movement in guides carried by said frame, means for moving said plate vertically and holding it in adjusted position, said means comprising gear and rack mechanism, a forwardly projecting arm carried by said vertically disposed plate, said arm carrying at its forward end a vertically disposed rotatable edge cutting disc, said disc being disposed in front of said sod undercutting plate in alignment with the apex thereof, said disc normally being held by resilient means at a lower level than that of said sod undercutting plate.

4. Apparatus for cutting sod comprising a frame, means for supporting the frame for movement along the surface of the sod, said means comprising a pair of rollers disposed on opposite sides of the frame at the rear end thereof, rollers for supporting the forward ends of said frame, said forward and rear rollers having overlapping paths so that a predetermined width of sod will be rolled, a sod cutting mechanism supported by said frame, said sod cutting mechanism comprising a sod undercutting plate of triangular form with its apex directed forwardly, said plate being substantially horizontally disposed, a vertically disposed plate in alignment with the apex of said sod undercutting plate and having its lower end connected to said sod undercutting plate, said vertical plate being mounted for vertical movement in guides carried by said frame, means for moving said plate vertically and holding it in adjusted position, said sod undercutting plate being disposed below the level of said rear rollers and having its rear portion extending laterally beneath said rolls, a forwardly projecting arm carried by said vertically disposed plate, said arm carrying at its forward end a vertically disposed rotatable edge cutting disc which normally has its cutting edge below the level of said sod undercutting plate, said disc being disposed in front of said sod undercutting plate in alignment with the apex thereof.

BOIVIN CLARK RANNEY.